United States Patent [19]

Sosa

[11] 4,072,640

[45] Feb. 7, 1978

[54] COPOLYMERIZATION OF VINYL MONOMERS WITH CELLULOSE AND STARCH IN COPPER AMMONIUM SOLUTIONS

[75] Inventor: Jose M. Sosa, Altos de Pipe, Venezuela

[73] Assignee: Instituto Venezolano de Investigaciones Cientificas, Estado Miranda, Venezuela

[21] Appl. No.: 653,511

[22] Filed: Jan. 29, 1976

[51] Int. Cl.$^2$ ............................ C08L 1/02; C08L 3/02
[52] U.S. Cl. ........................ 260/17.4 GC; 204/159.12; 260/17.4 CL; 260/17.4 ST
[58] Field of Search ............... 260/17.4 GC, 17.4 CL; 204/159.12

[56] References Cited

U.S. PATENT DOCUMENTS

| | | | |
|---|---|---|---|
| 3,008,920 | 11/1961 | Urchick | 260/17.4 |
| 3,297,786 | 1/1967 | Horowitz | 260/17.4 |
| 3,635,857 | 1/1972 | Restaino et al. | 260/17.4 |

*Primary Examiner*—Edward M. Woodberry
*Attorney, Agent, or Firm*—Browdy and Neimark

[57] ABSTRACT

A process for the production of starch or cellulose copolymers with vinyl monomers by dissolving the starch or cellulose in copper ammonium solution, adding the vinyl monomer and catalyzing with light or heat. Methyl methacrylate can also be homopolymerized by this process.

10 Claims, No Drawings

COPOLYMERIZATION OF VINYL MONOMERS WITH CELLULOSE AND STARCH IN COPPER AMMONIUM SOLUTIONS

FIELD OF THE INVENTION

The present invention relates to the copolymerization of vinyl monomers with cellulose and starch and particularly through the use of copper ammonium solution.

BACKGROUND OF THE INVENTION

The production of copolymers of cellulose and starch with vinyl monomers has been studied widely in the past years. The interest in obtaining copolymers of these abundant natural materials with vinyl monomers lies mainly in the production of fibers and synthetic papers with improved properties. Copolymers of these materials with methyl methacrylate, acrylonitrile, acrylic acid and methacrylic acid have been used in ion exchangers, as dispersing agents and as paper additives.

The patent literature reveals many processes for the production of cellulose copolymers using gamma radiation, e.g. U.S. Pat. No. 3,561,933 and by oxidizing cellulose, e.g. U.S. Pat. No. 3,095,391. All of the processes differ in the method of producing the active species on cellulose or starch, but are alike in that they are heterogenous processes that produce graft copolymers.

A slightly different procedure for synthesizing cellulose copolymers has been to make a soluble cellulose ester and utilizing this as a chain transfer agent. Different types of reactions have also been attempted, e.g. U.S. Pat. No. 3,455,853.

SUMMARY OF THE INVENTION

The present invention deals with an entirely different method of preparing cellulose and starch copolymers in solution without modifying the natural material previously. Use is made of the important and well-known properties of copper ammonium solutions.

Copper ammonium solutions (aqueous solutions of cupric ammonium hydroxide $(Cu(NH_3)_4(OH)_2)$, also known as Cuam have been used since 1920 for the production of artificial rayon. It is well known that natural cellulose and starch are degraded via a free radical mechanism in these solutions. Heat, oxygen, and light catalyse the degradation of these products.

The importance of the method proposed here strives on accelerating and controlling the degradation of cellulose or starch in solution in the presence of vinyl monomers. Thus, free radicals formed during the degradation reaction provide the active species for the initiation of the polymerization of vinyl monomers. There are several important advantages of this process. Since the degradation of the natural material can be controlled, different products can be obtained. The reaction is entirely homogeneous giving products that are easily purified and characterized. It is believed that this reaction will yield block copolymers, since the active species is formed at the end of the chain.

DETAILED DESCRIPTION OF PREFERRED EMBODIMENTS

From the following examples, it will be seen that the process is novel because of its simplicity. It is very cheap compared to processes where the cellulose or the starch are first modified or where gamma radiation is used. Also the reaction is fast with some monomers. Scraps can be used to obtain good products since the dissolution of the cellulose can be thought of as a purification step. Homopolymerization and copolymerization may take place using monomer to cellulose weight ratios as low as 1:1 or as high as 100:1. Copolymers containing up to 200% by wt synthetic polymer can be obtained.

EXAMPLE 1

Cellulose or starch in any form are dissolved in a copper ammonium solution, of composition well-known to those of ordinary skill in the art of cuprammonium processes, until a two percent solution is obtained. Solutions of cellulose with Cuam are very viscous above 2% by wt cellulose. Since good stirring is required for the proper mixing of the aqueous and organic layers, the concentration of cellulose is kept below this value. It is also known that most celluloses can be dissolved using a solution containing 20–30 grams of copper and 200 grams of ammonia per liter. To one hundred mls of the two percent solution, fifty mls of methylmethacrylate are added. The mixture is well stirred and either heat or light is applied to the dark blue solution. After a few minutes a lighter blue is observed. After thirty to forty-five minutes homopolymer is formed; this aids in emulsifying the organic layer. Since copolymerization depends on the rate of degradation of the cellulose or the starch, this process takes longer and the amount of copolymer formed depends somewhat on the time of reaction. However, it was found that little is gained by allowing reaction times greater than twenty hours. Thus, the reaction is continued for four hours. After the reaction is complete, the pH of the solution is adjusted between two and four. Immediately, the blue color disappears and a white mass remains. A fraction of the white mass can be extracted with acetone, while the other fraction is insoluble. The yield of the fraction soluble in acetone is twenty g and it consists of homopolymer if light is used. Very little homopolymer is obtained with heat. The yield of the insoluble fraction is seven grams.

EXAMPLE 2

Using the same conditions as in example 1, but increasing the amount of monomer fourfold and allowing the reaction to proceed for twenty hours, a white precipitate is recovered after adjusting the pH of the solution. Part of the precipitate is soluble in chloroform, part is soluble in dimethylformamide, and part is insoluble. The fraction that is soluble in dimethylformamide forms films which are superior in strength compared to films of poly(methyl-methacrylate).

EXAMPLE 3

Using the same conditions as in example 1, but using equal parts of acrylonitrile and methacrylic acid, a white precipitate is recovered after adjusting the pH of the solution. Part of the product is soluble in hot water and the other is soluble in acetone. Small quantities of the fraction dissolved in water greatly increases the viscosity of aqueous solutions. The other fraction resembles adsorbent paper.

EXAMPLE 4

A mixture consisting of equal parts of copper ammonium solution and methylmethacrylate yields oligomers or high molecular weight products that do not resemble those obtained when cellulose or starch are present. When cellulose or starch are present in the reaction mixture, chain transfer reactions may occur between the homopolymer radical and the cellulose or starch molecule. Thus, this may be the reason for obtaining homopolymers with slightly different characteristics when these substances are not present. These differences are readily observed using infra-red spectroscopy.

The examples given demonstrate a novel process that can be used to obtain copolymers of starch or cellulose using copper ammonium solutions that can vary in their $Cu/NH_3$ ratio, as is well known to those skilled in the cuprammonium process. To those skilled in the art, it should be apparent that this process has many advantages of other processes that have been used in the past to prepare cellulose and starch copolymers with vinyl monomers.

It will be obvious to those skilled in the art that various changes may be made without departing from the scope of the invention and the invention is not to be considered limited to what is described in the specification.

What is claimed is:

1. A process for the copolymerization of starch or cellulose with a vinyl monomer or monomers, comprising:
   dissolving the starch or cellulose in a copper ammonium solution and adding the vinyl monomer or monomers thereto;
   catalyzing polymerization with heat or light until the desired polymer is achieved; and
   recovering the polymer so produced.

2. A process in accordance with claim 1 wherein said vinyl monomer or monomers is methylmethacrylate.

3. A process in accordance with claim 1 wherein said vinyl monomer or monomers is a mixture of two or more of acrylonitrile, acrylic acid, methylmethacrylate or methacrylic acid.

4. A process in accordance with claim 1 wherein the polymerization is continued for about 4 to about 20 hours.

5. A process for the homopolymerization of methyl methacrylate, comprising:
   dissolving starch or cellulose in a copper ammonium solution and adding the methyl methacrylate thereto;
   catalyzing polymerization with light; and
   stopping the polymerization reaction after homopolymerization has begun but before copolymerization of the methyl methacrylate with the starch or cellulose begins, said stopping being after between about 30 minutes and 4 hours.

6. A process in accordance with claim 5 wherein said polymerization is stopped after about 4 hours.

7. A process in accordance with claim 1, wherein said starch or cellulose is dissolved in an amount up to about 2% in said copper ammonium solution.

8. A process in accordance with claim 1, wherein the weight ratio of vinyl monomer or monomers to starch or cellulose is in the range of 1:1 to 100:1.

9. A process in accordance with claim 1, wherein said copper ammonium solution comprises about 20–30 grams copper and about 200 grams of ammonia per liter.

10. A process in accordance with claim 5, wherein said polymerization is stopped after about 30 to 45 minutes.

* * * * *